Inventors
Robert C. Odell
Herman C. Frentzel
Dane J. Scag
John M. Netzler
by Robert B. Benson
Attorney

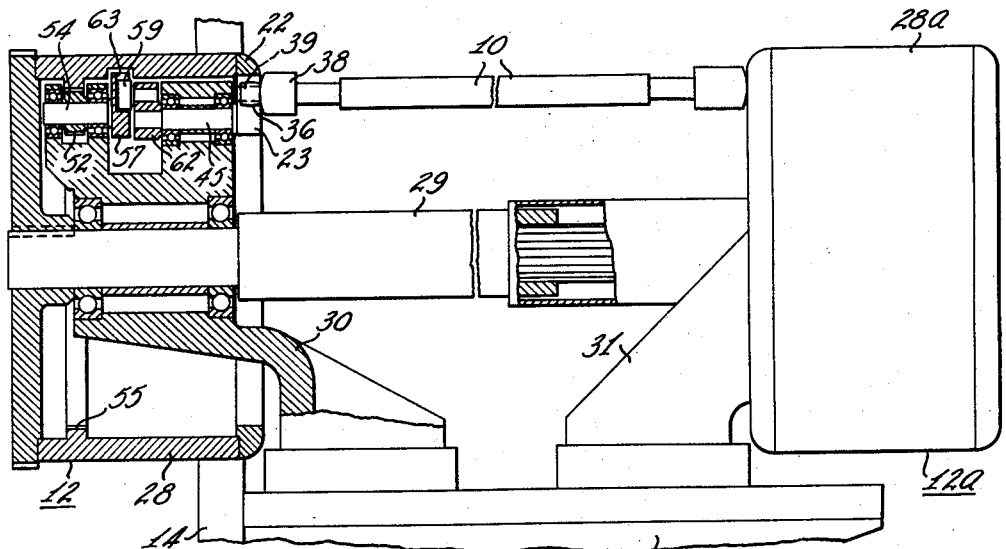
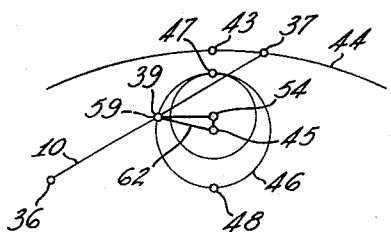
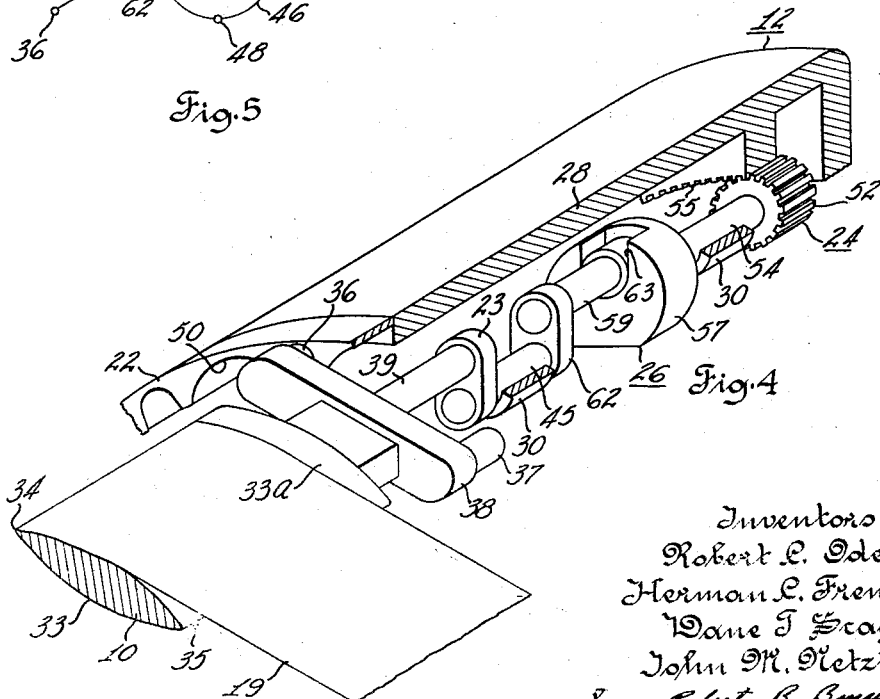
Fig. 2
Fig. 5
Fig. 4
Inventors
Robert C. Odell
Herman C. Frentzel
Dane T. Frag
John M. Netzler
by Robert B. Benson
Attorney

United States Patent Office 2,944,753
Patented July 12, 1960

2,944,753

CAPACITOR PACK WINDING MACHINE

Robert C. Odell, Waukesha, and Herman C. Frentzel, Shorewood, Wis., Dane T. Scag, Princeton, N.J., and John M. Netzler, Milwaukee, Wis., assignors to Allis-Chalmers Manufacturing Company, Milwaukee, Wis.

Filed Apr. 9, 1958, Ser. No. 727,459

5 Claims. (Cl. 242—67.3)

This invention relates in general to a capacitor pack winder. More specifically this invention relates to a capacitor winder for winding flat capacitor packs.

Power capacitors usually have a number of individually wound capacitor elements or packs. Packs are made by winding together strips of foil interposed between several strips of insulating paper. In most cases flat packs are used in order to save space in the capacitor container and to increase the pack surface area contacting the walls of the container for transferring heat from the packs. Usually the packs are wound round and are then flattened. Round winding is smooth in operation, and therefore the round packs can be wound rapidly. However, a problem exists when the round packs are flattened. Although the perimeter of a pack is the same both before and after flattening, the circular cross section of the pack has a greater area than the oval or flattened cross section. Consequently when the round packs are flattened to the smaller oval shape, the inner layers of foil and paper are crowded and tend to wrinkle, and the material may be weakened and may tear. The layers of paper and foil are particularly liable to curl around the metal strips which are inserted in the packs during winding to serve as electrical terminals. Packs that are weakened by flattening may have a shortened service life.

A pack which is wound in approximately its final flattened form does not have to be flattened and is less apt to fail than a pack which is wound round and then flattened. However, it is not satisfactory merely to use a flat mandrel in place of a round mandrel for winding packs. The pulling edges of such a mandrel accelerate and decelerate sinusoidally in the direction of the path of the material and, therefore, jerk the material. The rolls that supply the paper and foil to the mandrel tend to override as the mandrel decelerates and to take out the tension in the material that is necessary for smooth winding. The pulling edge of the mandrel also has a sinusoidal motion transverse to the path of the material approaching the mandrel which causes the material to whip back and forth during each half revolution of the mandrel. The paper and the foil used in capacitor packs is generally only a few ten thousandths of an inch thick and has very low tearing strength. Consequently, winding packs on such a mandrel must be extremely slow or the material will tear.

The capacitor pack winder of this invention revolves a generally flat mandrel through a complex path such that the paper and foil are fed onto the mandrel in a substantially straight line and at a virtually uniform rate. The winder drives the pulling edge of the mandrel through a shallow arc to pull the paper and foil out from the rolls and into a winding position. Simultaneously the winder drives the center of the mandrel in a path which causes the mandrel to pivot about its pulling edge for a half revolution. The mandrel center drive also positions the idle edge of the mandrel to start the next cycle. The motion of the mandrel is the result of several simple circular motions; and consequently, the winder does not require eccentric gears or special cams even though the mandrel rotates eccentrically.

Therefore, it is an object of this invention to provide a new and improved capacitor pack winder.

Another object of this invention is to provide a new and improved device for winding capacitor packs on a generally flat mandrel.

Another object of this invention is to provide a new and improved device for winding generally flat capacitor packs.

Other objects and advantages will be apparent from the following description when read in connection with the following drawings in which:

Fig. 2 shows an elevational view of the mandrel revolving mechanism partially in section;

Fig. 4 is an isometric view of the mandrel revolving mechanism; and

Fig. 5 is a schematic view showing a method for determining relative positions of the moving parts in the mandrel drive assembly.

Figure 1:
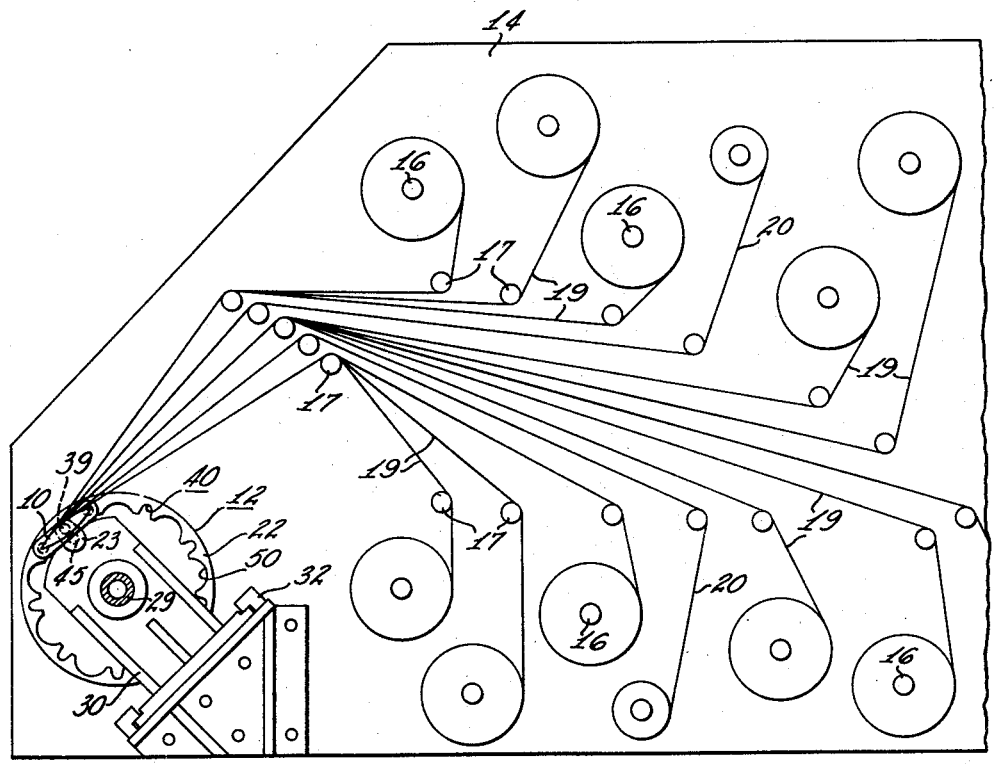
Fig. 1 is a side view of the capacitor winder of this invention partially in section.

The pack winder of this invention comprises a generally flat mandrel 10, a mandrel revolving mechanism 12, 12a positioned at either end of the mandrel, and a face plate 14 supporting spindles 16 and guides 17 for feeding strips of paper 19 and foil 20 onto the mandrel. The mandrel revolving mechanism 12 includes a ring 22 for driving an edge of the mandrel in an arcuate path, a crank 23 for driving the center of the mandrel in a circular path, and a set of gears 24 and a nonuniform motion device 26 for operating the ring and the mandrel center drive crank together.

The revolving mechanisms 12, 12a include two drums 28, 28a that are mounted on a common shaft 29. The shaft 29 is rotatably mounted on two supporting members 30 and 31. The supporting member 30 is positioned with respect to the face plate 14 by a base 32. The support member 31 is slidably mounted on the base 32, and the shaft 29 is expandable to allow removing the mandrel from the winder. The member 30 also supports within the drum 28 the crank 23, the nonuniform motion device 26 and one of the gears 24. The member 31 supports similar elements of the revolving mechanism 12a.

The mandrel 10 is constructed to have two spaced apart winding edges 34, 35. These edges may, for example, be formed by two suitably connected spaced parallel bars. Preferably, as shown, the mandrel has winding surfaces 33, 33a defining a thin elliptical cross section to provide rigidity and to provide a recessed space for locating paper clamping and releasing means and space for collapsing the mandrel to remove a completed pack. The shape of the mandrel influences to only a slight extent the velocity of the paper and foil, and no particular cross section is necessary. For example, the mandrel may have flat surfaces combined to form a thin diamond cross section. Pins 36 and 37 are attached to a block 38 that is in turn removably mounted at the end of the mandrel to facilitate removing a completed pack. The pins 36, 37 are aligned closely with the edges 34, 35 of the mandrel for engaging pulling edge 34 or 35 of the mandrel with the ring 22. A pin 39 for connecting the center of the mandrel to the mandrel center drive crank 23 is located at each end of the mandrel midway between the edge pins 36, 37.

The spindles 16 for rolls of paper 19 and foil 20 for winding the packs may be positioned as desired on the face plate 14, but the guides 17 should be arranged somewhat as shown in Fig. 1 so that all the strips of material approach the mandrel closely parallel with the path of the mandrel pulling edge. In other words the general path 42 of the paper and foil is approximately tangent to the midpoint 43 of the arcuate path of the pulling edge of the mandrel, as is shown in Fig. 5.

The ring 22 has inwardly facing spaced grooves 40 for receiving the edge pins 36, 37 of the mandrel 10. The grooves 40 are equally spaced so that one pin 36 or 37 may enter a groove as the other pin 36 or 37 leaves a groove. The grooves 40 therefore resemble internal gear teeth and in operation the mandrel 10 and the ring 22 resemble gears. Any number of grooves 40 may be used so long as there are at least three. As shown, nine grooves are arcuately spaced 40 degrees apart along the inner circumference of the ring 22. The cord distance between adjacent grooves 40 is equal to the distance between the edge pins 36, 37 so that as one pin 36 or 37 leaves one groove 40, the other pin 36 or 37 enters the immediately succeeding groove.

Figure 3A:
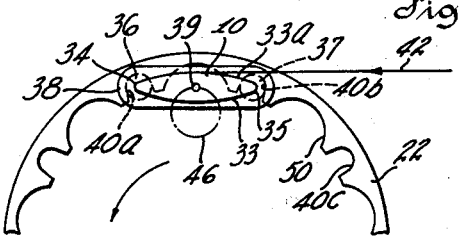
Figs. 3A through 3D show parts of the winding mechanism at successive stages in a winding cycle.
Figure 3C:
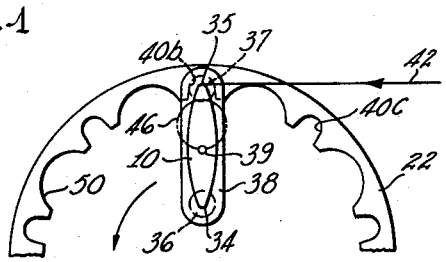
Figure 3B:
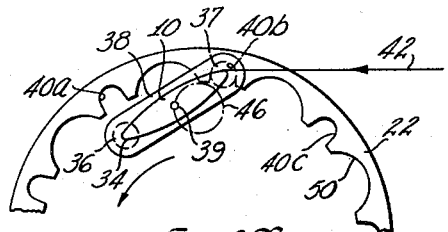
Figure 3D:
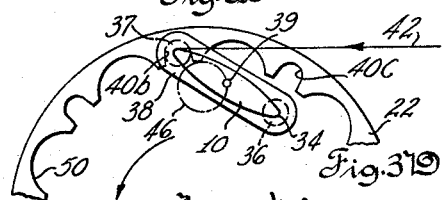

During each winding cycle the mandrel makes one-half revolution. At the beginning of a winding cycle the mandrel 10 is parallel to the general path 42 of the material, and both pins 36 and 37 are positioned in grooves 40a and 40b of the ring 22, as is shown in Fig. 1 and in more detail in Fig. 3A. As the ring 22 rotates, the forward pin 36 is released from the groove 40a, as in Fig. 3B, by the action of the mandrel center drive crank 23 as will be explained separately. The pulling edge 35 of the mandrel travels with the rotating ring 22 along an arcuate path 44 and pulls with it the paper and foil. The mandrel center drive crank 23 coacts with the ring 22 through the intermediate means 24 and 26 so that when the ring 22 has turned 20 degrees or has completed half the winding cycle, the mandrel has made a quarter turn as in Fig. 3C and is at 90 degrees with respect to its position at the beginning of the cycle. As the pulling edge 35 of the mandrel completes the 40 degree path, the pin 36 of the idle edge 34 of the mandrel swings into the succeeding groove 40c of the ring and the material which has been pulled across the 40 degree arc by the edge 35 of the mandrel is wound onto the mandrel. As the cycles continue, the edges 34, 35 of the mandrel alternately pull the material from the rolls across the 40 degree arc.

The mandrel center drive crank 23 positions the pulling edge pin 36 or 37 in a groove 40 of the ring 22 and coacts with the ring to revolve the mandrel a half revolution during each cycle. The crank 23 is attached to a shaft 45 that is rotatably mounted on the supporting member 30. The crank 23 swings the mandrel center in a circular path 46 intermediate the center and the circumference of the ring. At the beginning of a cycle as in Fig. 3A and Fig. 5 the pin 39 at the center of the mandrel is at a point 47 on path 46 nearest the path 44 of the edge pins 36, 37. When the mandrel has rotated 90 degrees at the halfway point of a cycle as in Fig. 3C the pin 36 is at a point 48 on path 46 that is farthest from the path 44. The ring 22 has recesses 50 between grooves 40 which allow the crank 23 to clear the ring during rotation of the crank.

Substantially all of the motion of the paper and foil is produced by the edge of the mandrel because only the edge of the mandrel pulls the approaching paper and foil during most of the winding cycle. The forward component of the velocity of the mandrel pulling edge is proportional to the cosine of the angular position of the pin engaging a groove in the ring 22 relative to the direction of the paper (see Fig. 5). The leading edge of the mandrel has its lowest forward velocity at the beginning and end of each cycle and the highest forward velocity at the midpoint of the cycle. Since there are 20 degrees between the points of the minimum and maximum velocity in the winder illustrated, the minimum velocity is related to the maximum forward velocity by the cosine of 20 degrees or in other words is approximately 94 percent of the maximum velocity. By comparison the forward velocity of a flat mandrel revolving normally about its central axis would vary from zero at the beginning and end of the cycle to a maximum velocity midway through the cycle. If the grooves 40 are spaced angularly closer, such as by providing a larger number of grooves on a larger ring, the variation of the paper velocity may be further narrowed. If a perfectly flat path is required, grooved catches may be mounted on a chain or other means which will carry the mandrel leading edge in a straight line.

Each of the nine grooves 40 of the ring 22 produces a complete winding cycle during a revolution of the ring. That is, there are nine cycles and four and one-half complete revolutions of the mandrel during one revolution of the ring. The center drive shaft 45 and crank 23 revolve once completely during each cycle. Therefore, a set of 9:1 ratio gears 24 are provided for coupling the center drive crankshaft 45 to the ring. A gear 52 is positioned on a shaft 54 that is rotatably mounted on the supporting member 30 for meshing with an internal gear 55 which is attached to the drum 28 and rotates with the ring 22. The geared shaft 54 is connected to the center drive shaft 45 through the nonuniform motion device 26.

As is indicated in Figs. 3A through 3D, the mandrel center does not swing in its circular path 46 at a uniform rate. For example in Fig. 3B, which shows the position of the mandrel center slightly less than one-quarter of the way through the circular path 46, the mandrel pulling edge 35 is somewhat more than one-quarter of the way through its path 44. Similarly in Fig. 3D when the mandrel center is slightly more than three-quarters of the way through the path 46, the mandrel pulling edge 35 is less than three-quarters of the way through the path 44. The crankshaft 45 periodically lags and leads the relative position of the ring 22 on successive half cycles. The nonuniform motion device 26 converts the uniform rotation of the geared shaft 54 to the nonuniform rotation of the crankshaft 45 required for the mandrel center pin 39 to follow the ring 22 properly. A radially slotted cam 57 is attached to the uniformly rotating shaft 54 and a cooperating pin 59 that is carried on an arm 62 attached to the nonuniformly rotating center drive shaft 45 and positioned to ride in the slot 63 of the cam 57. The coupled shafts 45 and 54 are offset so that as the two shafts rotate the position of the pin 59 in the slot 63 varies and thereby varies the effective radius of the slotted cam 57. The slotted cam 57 and the pin 59 have equal angular positions only at the beginning and end of a cycle and at the midpoint of a cycle. Similarly, the mandrel center drive and the ring are in step at these points. The center drive shaft 45 will lag the geared shaft at the beginning of the cycle and will lead the geared shaft toward the end of the cycle by varying amounts which depend on the amount of fixed offset between the two shafts. The correct offset between the two shafts 45 and 54 may be determined easily from a scale drawing similar to Fig. 5 in which the mandrel 10 is shown one-quarter of the way through the path 44. The uniformly rotating geared shaft 54 should be offset as shown so that the radial slot 63 of cam 57 will turn 90 degrees from the position of the cam in Fig. 4 to also make one-quarter of a cycle in this period. When the two shafts 45, 54 are properly offset, the slotted cam 57 does not merely correct the position of the center drive shaft 45 at one-quarter of a cycle, but the center drive shaft 45 will be properly positioned throughout the cycle.

When a pack has been wound with the desired number of turns of foil and paper, the paper and foil are separated from the rolls and the right hand winding mechanism 12a is moved away from the winder to remove the pack from the mandrel. The mandrel may remain engaged with the left hand winding mechanism or the mandrel may be removed completely from the winder for removing the pack.

It will be apparent to those skilled in the art that although only one embodiment of this invention has been illustrated, various changes are possible within the scope of the appended claims.

What is claimed is:

1. A winder for strip material comprising a mandrel, means for supplying said material to said mandrel, said mandrel having spaced winding edges transverse to the path of said material, means for engaging said mandrel near one of said edges and driving said one edge outward from said supply means for a distance approximately equal to the distance between said edges, said driving means and said one edge cooperating to pull said material from said supply means at a substantially uniform rate into a winding position with respect to said mandrel, and means for pivoting said mandrel about said one edge to wind said material on said mandrel and to position another of said edges to be engaged by said engaging means.

2. A winder for strip material comprising a generally flat mandrel having two spaced parallel winding edges and being rotatable about a central axis, means for supplying said material to said mandrel, said mandrel having pins extending from said edges, a ring having inwardly facing spaced grooves for receiving said pins, said ring being rotatable to drive one and then the other of said edges through an arcuate first predetermined path to pull said material from said supply means into a winding position with respect to said mandrel, said path having an end point and a beginning point spaced from said end point toward said supply means a distance approximately equal to the distance between said edges, and means rotatably engaging said mandrel through said central axis for moving said central axis through a second predetermined path in step with said rotating ring, said central axis moving means cooperating with said ring to pivot said mandrel about the axis of one of said edges to wind said positioned material on said mandrel, said second path having a first point corresponding in time with said beginning point of said first path and spaced between said beginning point and said end point of said first path, said second path having a second point corresponding in time with a point in said first path approximately midway of said beginning point and said end point, said second point being spaced from said midpoint radially inward with respect to said ring a distance substantially equal to the distance between said central axis and one of said winding edges.

3. A winder for strip material comprising a generally flat mandrel having two spaced apart parallel winding edges and being rotatable about a central axis, said mandrel having pins extending from said edges, means for supplying said material to said mandrel, a ring having inwardly facing grooves, said grooves being spaced apart to momentarialy receive two of said pins, said ring being rotatable to drive one and then the other of said edges through a predetermined arcuate path to wind said material on said mandrel, and means for positioning said mandrel with respect to said ring to maintain at least one of said pins in one of said grooves, said positioning means comprising a crank rotatably engaging said mandrel through said central axis, gear means for rotating said crank in step with said rotating ring and cam means for correlating the angular position of said rotating crank with the angular position of said rotating ring.

4. A capacitor winder comprising a mandrel having two oppositely facing winding surfaces and two spaced winding edges, said mandrel having pins extending from said edges of said mandrel, means for supplying capacitor material to said mandrel in a path transverse to said surfaces and said edges, a ring having spaced grooves for receiving said pins, said ring being rotatable to carry said edges in succession through a predetermined arcuate path to pull said material into a winding position with respect to alternate of said winding surfaces, a rotatable crank acting through an axis of said mandrel intermediate said edges to pivot said mandrel about said pins as they are carried through said arcuate path to wind said positioned material about one of said surfaces, and means for correlating said rotation of said crank and said rotation of said ring, said means comprising gears for rotating said crank in a complete circle while one of said grooves travels said arcuate path and cam means for varying the relative angular velocities of said crank and said ring to maintain at least one of said pins positioned in one of said receiving grooves.

5. A capacitor winder comprising a mandrel having two oppositely facing winding surfaces and two spaced winding edges, said mandrel having pins extending from said edges of said mandrel, means for supplying capacitor material to said mandrel in a path transverse to said surfaces and said edges, a ring having spaced grooves for receiving said pins, said ring being rotatable to carry said edges in succession through a predetermined arcuate path to pull said material out from said supply means at a virtually constant rate and into a winding position with respect to alternate of said winding surfaces, a rotatable crank acting through an axis of said mandrel midway of said edges to pivot said mandrel about said pins as they are carried through said arcuate path to wind said positioned material about one of said surfaces, and means for correlating said rotation of said crank and said rotation of said ring to maintain at least one of said pins positioned in one of said receiving grooves, said correlating means comprising a rotatable cam having a radial slot, a crank pin adapted to rotate with said crank and positioned to ride in said slot, said crank and said cam being rotatable about mutually offset axes, and gear means intermediate said ring and said cam for rotating said crank a complete revolution while one of said pins is carried through said arcuate path by said ring.

References Cited in the file of this patent

FOREIGN PATENTS 98,730     Germany _____ Aug. 17, 1898